3,213,052
FLAME-RESISTANT ACRYLONITRILE POLYMER COMPOSITIONS CONTAINING POLYBROMO-CYCLOHEXANES AND CALCIUM PHOSPHATES

Fred J. Lowes, Jr., Midland, Mich., assignor to The Dow Chemical Company, Midland, Mich., a corporation of Delaware
No Drawing. Filed Jan. 8, 1962, Ser. No. 165,032
20 Claims. (Cl. 260—29.6)

This invention relates to compositions of matter that are especially adapted for use in spinning acrylontrile polymer synthetic textile fibers or the like structures. It relates more particularly to spinnable solutions of such polymers in concentrated aqueous salt solutions having certain polybromocyclohexanes and substantially water-insoluble calcium phosphates dispersed therein. The invention is also concerned with shaped articles, especially filamentary structures having durable flame-resistant properties and, to methods for preparation of such compositions and articles.

The expression "flame-resistant" as employed herein, means a material which imparts resistance to afterflame after being ignited in an open flame and then removed from the flame.

The expressions "flameproofing mixture" and "flameproofing finish," as employed herein, mean a mixture or finish which imparts resistance to afterflame of a material which has been ignited in an open flame and then removed from the flame.

The expressions "self-extinguishing" and "flameproof," as employed herein, mean incapable of sustaining a flame until completely burned after a material has been ignited and then removed from the source of ignition.

The expression "water-insoluble calcium phosphates" as employed herein means any calcium salt of phosphoric acid which is substantially insoluble in water.

The expression "polybromocyclohexanes" as employed herein means those bromocyclohexane compounds having at least 3 bromine atoms in the molecule and includes tribromotrichlorocyclohexane, tetrabromodichlorocyclohexane, pentabromomonochlorocyclohexane, hexabromocyclohexane, and suitable mixtures thereof.

Polyacrylonitrile and many of the fiber and film-forming copolymers of acrylonitrile may advantageously be fabricated by a wet spinning process wherein the polymer composition is extruded from compositions of the polymer in polyacrylonitrile-dissolving aqueous saline solvents, particularly aqueous solutions of zinc chloride and its saline equivalents. Such a procedure, as is well known in the art, is oftentimes referred to as salt-spinning with the fibers (or other shaped articles) obtained thereby being salt-spun. In salt-spinning, the fiber-forming, aqueous saline spinning solution or other compositions of the polymer is extruded during the spinning operation into a non-polymer-dissolving coagulation liquid, or spin bath, which frequently is a solution of the same salt or salts as are in the spinning solution.

Acrylonitrile polymers (including fiber-forming copolymers) particularly polyacrylonitrile, that are salt-spun in the referred-to manner are generally formed initially as aquagel intermediates. Such intermediates have a water-swollen or hydrated structure prior to their being finally irreversibly dried to the desired, characteristically hydrophobic, product.

Advantageously, the aquagel structure of polyacrylonitrile and other fiber and film forming acrylonitrile polymers may be derived by the extrusion into and coagulation in an aqueous coagulating spin bath of a solution of the acrylonitrile polymer that is dissolved in an aqueous zinc chloride saline solvent therefor. It is usually desirable for zinc chloride to be at least the principal (if not the entire) saline solute in the aqueous saline solvent solution.

If preferred, however, various of the saline equivalents for zinc chloride may also be employed in the aqueous saline solvent medium for the spinning solution and the coagulating bath utilized. These zinc chloride equivalents, as is well known, include various of the thiocyanates (such as calcium thiocyanate) lithium bromide and the salts and salt mixtures that are "solvent" members of the so-called "lyotropic" series as are disclosed, among other places, in U.S. 2,140,921, 2,425,192, 2,648,592, 2,648,593, 2,648,646, 2,648,648, and 2,648,649.

Fabricated acrylonitrile polymer films, textile fibers and like filamentous articles derived from salt-spinning processes are generically described as being capable of lying substantially in a single plane, having at least one major dimension, and at least one minor dimension less than about 0.1 inch, said articles being characterized by having orientation of the molecules parallel to one another and to a major surface of the article.

Articles produced from acrylonitrile polymers by the wet spinning process have excellent physical properties but suffer from one serious effect, namely, low resistance to afterflame when ignited in an open flame and then removed from the flame.

The flameproofing of flammable materials, such as textile and other fabric materials by application of flameproofing finishes and like treatments is not new.

U.S. 2,669,521 to Lester A. Bierly, dated February 16, 1954, describes the use of chlorinated hydrocarbons, particularly chlorinated paraffin wax in combination with an inorganic oxide, preferably antimony oxide, and tricresyl phosphate as a flameproofing mixture for polymeric thermoplastic materials.

It is also known that the halogen content of halogenated organic compounds often has an effect of reducing the flammability both of the compound containing the halogen and of flammable organic materials intimately admixed therewith.

A considerable number of the organic halides decompose to evolve hydrogen halide and lose their flameproofing action at temperatures lower than the combustion point of compositions comprising the same.

Although it is known that certain organic halides alone or in combination with certain organic and inorganic flameproofing substances often exhibit a flameproofing action, it remains an unpredictable problem to discover such a compound, or compounds, which may satisfactorily be used to flame proof a given combustible organic material.

Accordingly, it is the primary object of the present invention to provide compositions of matter especially adapted for use in spinning synthetic films and textile fibers or like structures comprising solutions of high acrylonitrile polymers (i.e., those containing at least 85 weight percent of polymerized acrylonitrile in the polymer molecule).

A further object is to provide shaped articles from the compositions of the invention which have increased flame-resistance.

A still further object is to provide a method of producing the compositions and articles of the present invention.

Other and related objects will become evident from the following specification and claims.

In accordance with the present invention high acrylonitrile films and textile fibers having increased flame-resistance are produced from a polymeric spinning dispersion comprising (1) an acrylonitrile polymer containing in the polymer molecule at least about 85 weight percent of acrylonitrile dissolved in an aqueous saline solvent solution, preferably where zinc chloride is the principal (if not entire) saline solute, and, (2) dispersed therein at least about 10 weight percent based on polymer weight of a flameproofing mixture comprising (a) a polybromocyclohexane as will be described, said polybromocyclohexane being present in amounts sufficient to provide at least about 3.5 weight percent of bromine based on the weight of acrylonitrile polymer and, (b) a substantially water-insoluble calcium phosphate, the ratio of bromine to calcium phosphate being variable from about 0.7:1 and 5.5:1.

The acrylonitrile polymer employed in practice of the present invention is advantageously, polyacrylonitrile, although, as is readily apparent, any of the well-known fiber and film-forming copolymers thereof that contain, polymerized in the polymer molecule, at least 85 weight percent of acrylonitrile with at least one other ethylenically unsaturated monomer that is copolymerizable with acrylonitrile may, generally, be utilized. The acrylonitrile polymer employed is soluble in an aqueous saline solvent for acrylonitrile which, usually, has therein at least about 50–60 weight percent of zinc chloride or its saline equivalents. U.S. 2,776,946, among many other reference sources, sets forth many of the monomers which may be copolymerized or interpolymerized with acrylonitrile to produce binary or ternary acrylonitrile copolymers that are useful in the practice of this invention.

It has been discovered that polybromocyclohexanes such as tribromotrichlorocyclohexane, tetrabromodichlorocyclohexane, pentabromomonochlorocyclohexane, hexabromocyclohexane or mixture thereof are useful for the purposes of the instant invention.

Polybromochlorohexanes of the type described herein but having less than three bromine atoms in the molecule, do not provide sufficient flame-resistance to shaped articles produced from salt-spun acrylonitrile polymers and, consequently, are not useful for the purposes of the present invention.

The aforementioned bromochlorocyclohexane compounds can be prepared by reaction of chlorine and bromine with benzene in proportions corresponding to a ratio of from 1:5 to 3:3 gram chemical equivalents of the chlorine to bromide per gram molecular proportion of the benzene.

Mixtures of the compounds tribromotrichlorocyclohexane, tetrabromodichlorocyclohexane, and pentabromomonochlorocyclohexane can be obtained by varying reaction conditions and the ratio of chlorine and bromine to benzene employed in the reaction. For purposes of the instant invention such mixtures of the bromochlorocyclohexanes need not be separated into constituents since mixtures of such bromochlorocyclohexanes are operable for the purposes of the invention.

The preparation of these compounds is well known to those skilled in the art, such methods being disclosed among other places in U.S. 3,004,935 dated October 17, 1961.

Specific, substantially water-insoluble calcium phosphates which are useful for the present invention include but are not restricted to; tricalcium phosphate, calcium pyrophosphate, and calcium metaphosphate.

Water-soluble metal salts of phosphoric acid are not useful for the present invention. Additionally, many other phosphates commonly used in flame-resistant and flameproof compositions are not useful for the purpose of the present invention due to one or more undesirable properties; e.g., low flameproofing activity with the polybromocyclohexanes advantageously used in the present invention; insufficient insolubility in water; insufficient compatibility in the fiber-forming acrylonitrile polymers defined herein; and various other undesirable properties including, among others, objectionable color and odor.

As noted above, the flameproofing mixtures suitably used in the present invention are comprised of (a) a polybromocyclohexane as defined herein, said polybromocyclohexane being present in amounts sufficient to provide at least about 3.5 weight percent of bromine based on the weight of the fiber-forming acrylonitrile polymer and, (b) a substantially water-insoluble calcium phosphate, the ratio of polybromocyclohexane to calcium phosphate being variable from between about 0.7:1 and 5.5:1.

The flameproofing mixtures must be present in the polymer solution in a minimum amount of about 10 weight percent based on the weight of the acrylonitrile polymer. The permissible maximum proportion depends on the particular flameproofing mixture being employed and the limit of its compatibility with the aqueous saline solution, as well as the polymeric material contained therein. The maximum limit is generally about 20 weight percent, based on the weight of the acrylonitrile polymer.

The amount of flameproofing mixture present in shaped articles produced from salt-spun acrylonitrile polymers is dependent upon, and approximately in the same ratio as, the amounts of said mixtures incorporated in the spinning solution.

It has been observed that only the flameproofing mixtures, as defined herein, are suitable for achieving the ends of the present invention.

For example, flameproofing mixtures of the type described by the present invention, but having less than about 3.5 weight percent of bromine based on the weight of the acrylonitrile polymer, do not sufficiently impart durable, flame-resistant properties in shaped articles produced from acrylonitrile polymers and are not useful for the purposes of the present invention. Additionally, flameproofing mixtures of the type described herein but having a ratio of bromine to calcium phosphate other than between about 0.7:1 and 5.5:1 are not useful for the purpose of the present invention.

The flameproofing mixtures of the present invention may be suitably dispersed in the polymeric spinning solution by first intimately admixing the ingredients of such flameproofing mixture with about equal weight proportions of the herein described aqueous polymeric spinning solution to form a concentrate. It is oftentimes advantageous to incorporate in the concentrate about 2 weight percent based on the weight of spinning solution component of said concentrate of a suitable surface active agent (e.g., Aerosol C–61, a cationic 70 percent active reaction product of ethylene oxide and octadecylamine, octadecylcarbonic acid, and octadecyl quanidine, sold commercially by the American Cyanamid Company).

The resulting concentrate mixture is advantageously reduced to a particle size sufficient to allow at least about 95 percent of the mixture to pass through a 325 mesh screen, prior to addition, with stirring, to the remaining desired amounts of the aqueous polymeric spinning solution.

The flameproofing mixtures of the present invention are compatible with the acrylonitrile polymers defined herein when used in the prescribed amounts, and, are substantially water-insoluble. The above combination of desirable properties prevents excessive extraction of the flameproofing mixtures from the polymer while coagulating the polymer solution in an aqueous non-polymer-dissolving saline medium, and during subsequent water washing of the resulting aquagel and shaped article produced therefrom.

Shaped articles produced from acrylonitrile polymers by the process of the present invention do not significantly lose their flame-resistant properties even after repeated laundering.

It will be appreciated by those skilled in the art that various other materials can be added to the compositions of the present invention. Such materials include, for example, plasticizers, lubricants, dyes and pigments.

The following example, wherein all parts and percentages are to be taken by weight, illustrates the present invention but is not to be construed as limiting its scope.

EXAMPLE 1

In each of a series of experiments, separate charges of about 35 grams of a solution consisting of 10 percent polyacrylonitrile, 54 percent zinc chloride, and 36 percent water, all based on the total weight of the solution, were placed in each of a series of bottles.

Varying percentages of pentabromomonochlorocyclohexane, and tricalcium phosphate were individually admixed with approximately equal weight proportions based on the combined weight of pentabromomonochlorocyclohexane and tricalcium phosphate of an aqueous polyacrylonitrile spinning solution as described herein. To each of the individual mixtures was individually added from about 2 weight percent based on the weight of the aqueous polyacrylonitrile spinning solution component of the mixture, of Aerosol C-61 (a cationic surface active agent as described previously).

Each of the resulting concentrate mixtures was individually ground in a mortar until a homogeneous mixture having a particle size sufficient to allow at least about 95 percent of said mixture to pass freely through a 325 mesh screen was obtained.

Each of the individual homogeneous mixtures was separately added with stirring to the individual charges of aqueous polyacrylonitrile spinning solution described herein, until a homogeneous dispersion was, in each case, obtained.

The resulting individual samples were allowed to stand overnight at normal room temperatures to permit bubbles of entrapped air to escape.

Films about 0.01 inch thick 3 inches long and ⅞ inch wide were cast from each of the resulting spinning solutions on "Pyrex" glass plates using a stainless steel drawbar. The resulting films were coagulated by holding the coated plates in a stream of water at ambient temperature. Within 1 or 2 minutes after casting, the films were detached from the glass plates and were thoroughly water washed until free from zinc chloride.

The films prepared in this manner were aquagels which were each then oriented about 10 percent by stretching while immersed in an aqueous medium at a temperature of at least 65° C.

Each of the oriented films were dried overnight at normal room temperatures and reference marks placed along the length of the dried film at 1 inch intervals, the first of such reference marks being placed ¼ inch from one end of the film.

Each of the films was individually placed in a clamp with the length of said film horizontally disposed and the width of the film vertically disposed. Ignition of the film was accomplished by a paper match held in such a manner as to have the flame contact the edge of the film as nearly parallel as possible. The film was ignited ¼ inch from the first mark and the time in seconds recorded for 1 inch of said film to be consumed by the flame.

Film composition and burning rates are presented in the following Table 1.

Table 1

| Sample No. | $Ca_3(PO_4)_2$, Percent (Based on the weight of polymer) | Pentabromomonochlorocyclohexane, Percent (Based on the weight of polymer) | Bromine,[1] Percent (Based on the weight of polymer) | Burning Rate (Seconds required to burn 1 inch of film) |
|---|---|---|---|---|
| For Comparison: | | | | |
| 1 | | | | 4 |
| 2 | 10 | | | 7 |
| 3 | | 15 | 11.7 | 10.5 |
| This Invention: | | | | |
| 4 | 5 | 5 | 3.9 | 11.5 |
| 5 | 2.5 | 7.5 | 5.9 | 12.7 |
| 6 | 5 | 10 | 7.8 | 13.5 |
| 7 | 2.5 | 12.5 | 9.8 | 16 |
| 8 | 10 | 10 | 7.8 | ([2]) |
| 9 | 7.5 | 12.5 | 9.8 | ([2]) |
| 10 | 5 | 15 | 11.7 | ([2]) |
| 11 | 2.5 | 17.5 | 13.6 | ([2]) |

[1] Derived from indicated amounts of pentabromomonochlorocyclohexane.
[2] Self-extinguishing.

It is apparent from the results of Example 1 that self-extinguishing films were obtained using about 20 weight percent based on acrylonitrile polymer weight of a flameproofing mixture comprised of (a) at least about 7.5 weight percent of bromine based on the weight of acrylonitrile polymer, said bromine derived from pentabromomonochlorocyclohexane and, (b) tricalcium phosphate, the ratio of bromine to tricalcium phosphate being variable between about 0.7:1 and 5.5:1.

It is further apparent from the results of Example 1 that flame-resistant films were obtained using between about 10 weight percent and 15 weight percent based on acrylonitrile polymer weight of a flameproofing mixture comprised of (a) at least about 3.5 weight percent based on acrylonitrile polymer weight of bromine derived from pentabromomonochlorocyclohexane and, (b) tricalcium phosphate, the ratio of bromine to tricalcium phosphate being variable between about 0.7:1 and 4:1.

It is further apparent from the result of Example 1 that there is a synergistic effect as regards flame-resistance between the tricalcium phosphate and pentabromomonochlorocyclohexane; in other words, the tricalcium phosphates co-acts with the pentabromomonochlorocyclohexane to produce a high degree of flame-resistance to salt-spun acrylonitrile polymers.

Similar desirable flame-resistant properties are obtained in films and in fibers and like filamentous structures produced from salt-spun acrylonitrile polymers as derived herein, by incorporating in the spinning solution by the process of the present invention, any concentration between about 10 weight percent and 20 weight percent based on the weight of acrylonitrile polymer of a flame-proofing mixture comprising (a) at least about 3.5 weight percent based on the weight of acrylonitrile polymer of bromine derived from tribromotrichlorocyclohexane, tetrabromodichlorocyclohexane, pentabromomonochlorocyclohexane, hexabromocyclohexane or suitable mixtures thereof and, (b) a substantially water-insoluble calcium phosphate including tricalcium phosphate, calcium pyrophosphate and calcium metaphosphate, and mixtures thereof, the ratio of bromine to calcium phosphate being variable from between about 0.7:1 and 5.5:1.

Similar good results are obtained when fiber or film-forming acrylonitrile polymers containing at least 85 weight percent of polymerized acrylonitrile and up to 15 weight percent of one or more such copolymerizable materials as vinyl chloride, vinyl acetate, methyl and other alkyl acrylates or methacrylates, the vinyl pyridines, allyl alcohol, and many others well known to those skilled in the art are admixed with the flameproofing mixtures suitable for use in practice of the present invention.

What is claimed is:
1. Composition comprising a spinnable dispersion of

(1) a fiber-forming acrylonitrile polymer which contains in the polymer molecule at least about 85 weight percent of acrylonitrile, any balance being another monoethylenically unsaturated monomer that is copolymerizable with acrylonitrile, dissolved in (2) an aqueous saline solvent for polyacrylonitrile, said solvent having additionally dispersed therein (3) at least about 10 weight percent, based on the weight of the fiber-forming polymer, of a flameproofing mixture comprised of (a) a polybromocyclohexane having at least 3 bromine atoms in the molecule said polybromocyclohexane being present in amounts sufficient to provide at least about 3.5 weight percent of bromine, based on the weight of the fiber-forming polymer and, (b) a substantially water-insoluble calcium phosphate, the ratio of bromine to calcium phosphate being from about 0.7:1 to 5.5:1.

2. The composition of claim 1, wherein the flameproofing mixture is present in amounts between about 10 and 20 weight percent based on the weight of the fiber-forming polymer.

3. The composition of claim 1, wherein the polybromocyclohexane is pentabromomonochlorocyclohexane.

4. The composition of claim 1, wherein the substantially water-insoluble calcium phosphate is tricalcium phosphate.

5. The composition of claim 1, wherein the acrylonitrile polymer is polyacrylonitrile.

6. In the process of producing articles from a spinning solution of a fiber-forming acrylonitrile polymer which contains in the polymer molecule at least about 85 weight percent of acrylonitrile, any balance being another monoethylenically unsaturated monomer that is copolymerizable with acrylonitrile, which polymer is dissolved as a spinnable composition in an aqueous saline solvent for said fiber-forming polymer; the improvement consisting of dispersing in said spinning solution at least about 10 weight percent based on the weight of the fiber-forming polymer of a flameproofing mixture comprised of (a) a polybromocyclohexane having at least 3 bromine atoms in the molecule, said polybromocyclohexane being present in amounts sufficient to provide at least about 3.5 weight percent of bromine based on the weight of the fiber-forming polymer and (b) a substantially water-insoluble calcium phosphate, the ratio of bromine to calcium phosphate being from about 0.7:1 to 5.5:1.

7. The process of claim 6, wherein the flameproofing mixture is present in amounts between about 10 and 20 weight percent based on the weight of the fiber-forming polymer.

8. The process of claim 6, wherein the polybromocyclohexane is pentabromomonochlorocyclohexane.

9. The process of claim 6, wherein the substantially water-insoluble calcium phosphate is tricalcium phosphate.

10. A flame-resistant polymeric article of manufacture capable of lying substantially in a single plane, having at least one major dimension, and at least one minor dimension less than about 0.1 inch, comprised of (1) a fiber-forming acrylonitrile polymer which contains in the polymer molecule at least about 85 weight percent of acrylonitrile, any balance being another monoethylenically unsaturated monomer that is copolymerizable with acrylonitrile, and (2) uniformly dispersed therethrough at least about 10 weight percent, based on acrylonitrile polymer weight of a flameproofing mixture comprised of (a) a polybromocyclohexane having at least 3 bromine atoms in the molecule, said polybromocyclohexane being present in amounts sufficient to provide at least about 3.5 weight percent of bromine, based on the weight of acrylonitrile polymer and, (2) a substantially water-insoluble calcium phosphate, the ratio of bromine to calcium phosphate being from about 0.7:1 to 5.5:1.

11. The article of claim 10, wherein the flameproofing mixture is present in amounts between about 10 and 20 weight percent based on the weight of the fiber-forming polymer.

12. The article of claim 10, wherein the polybromocyclohexane is pentabromomonochlorocyclohexane.

13. The article of claim 10, wherein the polybromocyclohexane is tribromotrichlorocyclohexane.

14. The article of claim 10, wherein the polybromocyclohexane is tetrabromodichlorocyclohexane.

15. The article of claim 10, wherein the polybromocyclohexane is hexabromocyclohexane.

16. The article of claim 10, wherein the substantially water-insoluble calcium phosphate is tricalcium phosphate.

17. The article of claim 10, wherein the substantially water-insoluble calcium phosphate is calcium pyrophosphate.

18. The article of claim 10, wherein the substantially water-insoluble calcium phosphate is calcium metaphosphate.

19. The article of claim 10, wherein the acrylonitrile polymer is polyacrylonitrile.

20. The article of claim 10, wherein said article is a flame-resistane filamentary structure.

References Cited by the Examiner
UNITED STATES PATENTS

| | | | |
|---|---|---|---|
| 2,876,117 | 3/59 | Jackson et al. | 252—8.1 X |
| 3,004,935 | 10/61 | Raley et al. | 260—45.7 X |
| 3,050,424 | 8/62 | Schmitt | 252—8.1 X |
| 3,073,669 | 1/63 | Fujisaki | 260—29.6 X |

JOSEPH L. SCHOFER, *Primary Examiner.*